United States Patent
Acharya et al.

(10) Patent No.: US 6,658,399 B1
(45) Date of Patent: Dec. 2, 2003

(54) FUZZY BASED THRESHOLDING TECHNIQUE FOR IMAGE SEGMENTATION

(75) Inventors: Tinku Acharya, Chandler, AZ (US); Ajay K. Ray, West Bengal (IN); A. K. V. Subba Rao, West Bengal (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/393,136

(22) Filed: Sep. 10, 1999

(51) Int. Cl.⁷ ................................................ G06N 3/00
(52) U.S. Cl. ............................ 706/52; 706/900; 706/14
(58) Field of Search ............................ 706/8, 900, 14, 706/52

(56) References Cited

U.S. PATENT DOCUMENTS

| | | | |
|---|---|---|---|
| 5,014,134 A | 5/1991 | Lawton et al. | |
| 5,321,776 A | 6/1994 | Shapiro | |
| 5,392,255 A | 2/1995 | LeBras et al. | |
| 5,398,066 A | 3/1995 | Martinez-Uriegas et al. | |
| 5,491,561 A | 2/1996 | Fukuda | |
| 5,541,653 A | 7/1996 | Peters et al. | |
| 5,602,589 A | 2/1997 | Vishwanath et al. | |
| 5,706,220 A | 1/1998 | Vafai et al. | |
| 5,729,691 A * | 3/1998 | Agarwal | 709/247 |
| 5,737,448 A | 4/1998 | Gardos | |
| 5,875,122 A | 2/1999 | Acharya | 364/726.05 |
| 5,892,847 A * | 4/1999 | Johnson | 382/232 |
| 5,901,242 A | 5/1999 | Crane et al. | |
| 5,995,210 A | 11/1999 | Acharya | 356/73 |
| 6,002,446 A * | 12/1999 | Eglit | 348/581 |
| 6,009,201 A | 12/1999 | Acharya | 382/232 |
| 6,009,206 A | 12/1999 | Acharya | 382/251 |
| 6,047,303 A | 4/2000 | Acharya | |
| 6,091,851 A | 7/2000 | Acharya | |
| 6,094,508 A | 7/2000 | Acharya et al. | |
| 6,108,453 A | 8/2000 | Acharya | |
| 6,124,811 A | 9/2000 | Acharya et al. | |
| 6,130,960 A | 10/2000 | Acharya | |
| 6,151,069 A | 11/2000 | Dunton et al. | |
| 6,151,415 A | 11/2000 | Acharya et al. | |
| 6,154,493 A | 11/2000 | Acharya et al. | |
| 6,166,664 A | 12/2000 | Acharya | |
| 6,178,269 B1 | 1/2001 | Acharya | |
| 6,195,026 B1 | 2/2001 | Acharya | |
| 6,208,350 B1 * | 3/2001 | Herrera | 345/582 |
| 6,215,908 B1 | 4/2001 | Pazmino et al. | |
| 6,215,916 B1 | 4/2001 | Acharya | |
| 6,229,578 B1 | 5/2001 | Acharya et al. | |
| 6,233,358 B1 | 5/2001 | Acharya | |
| 6,236,433 B1 | 5/2001 | Acharya et al. | |
| 6,236,765 B1 | 5/2001 | Acharya | |
| 6,259,819 B1 * | 7/2001 | Andrew et al. | 382/248 |
| 6,269,181 B1 | 7/2001 | Acharya | |
| 6,275,206 B1 | 8/2001 | Tsai et al. | |
| 6,285,796 B1 | 9/2001 | Acharya et al. | |
| 6,292,114 B1 | 9/2001 | Tsai et al. | |
| 6,301,392 B1 | 10/2001 | Acharya | |
| 6,348,929 B1 | 2/2002 | Acharya et al. | |
| 6,351,555 B1 | 2/2002 | Acharya et al. | |
| 6,356,276 B1 | 3/2002 | Acharya | |
| 6,366,692 B1 | 4/2002 | Acharya | |
| 6,366,694 B1 | 4/2002 | Acharya | |
| 6,373,481 B1 | 4/2002 | Tan et al. | |
| 6,377,280 B1 | 4/2002 | Acharya et al. | |
| 6,381,357 B1 | 4/2002 | Tan et al. | |
| 6,381,636 B1 | 4/2002 | Cromer et al. | |
| 6,392,699 B1 | 5/2002 | Acharya | |
| 6,411,333 B1 * | 6/2002 | Auld et al. | 348/441 |
| 6,535,648 B1 | 3/2003 | Acharya | |
| 2001/0019630 A1 * | 9/2001 | Johnson | 382/232 |

OTHER PUBLICATIONS

X. Q. Li et al; A Fuzzy Logic Approach to Image Segmentation; 1994; IEEE; 1051–4651/94; 337–341*

(List continued on next page.)

Primary Examiner—Wilbert L. Starks, Jr.
Assistant Examiner—Joseph P. Hirl
(74) Attorney, Agent, or Firm—Brad A. Greenwald

(57) ABSTRACT

Embodiments of a fuzzy based thresholding technique for image segmentation are disclosed.

30 Claims, 6 Drawing Sheets

OTHER PUBLICATIONS

Acharya, et al., "Image Processing Method and Appartaus", application No: 09/359,523, Filed: Jul. 23, 1999, Attorney Docket No: 042390.P7323, 16 Pgs.

Acharya, et al., "Zerotree Encoding of Wavelet Data", application No; 09/390,255, Filed: Sep. 3, 1999, Attorney Docket No: 042390.P7057, 22 Pgs.

Acharya, et al., "A Fuzzy Distinction Based Thresholding Technique for Image Segmentation", application No: 09/393,017, Filed: Sep. 10, 1999, Attorney Docket No. 042390.P7115, 29 Pgs.

Huntsberger, et al., Representation of Uncertainty In Computer Vision Suing Fuzzy Sets, Reprinted form IEEE Trans. Comput., vol. C–35, No. 2, Feb. 1986, pp. 397–407.

Acharya, "A Memory Based VLSI Achitecture For Image Compression" application No: 08/885,415, Filed: Jun. 30, 1997, Attorney Docket No: 042390.P4425, 37 Pgs.

Bowolek, et al., "Infrared Correction System", Application No: 09/126,203, Filed: Jul. 30, 1998, Attorney Docket No: 042390.P6172, 23 Pgs.

Pazmino, et al., "Method of Compressing a Data Set Using Significance Mapping", application No: 09/151,336, Filed: Sep. 11, 1998, Attorney Docket No: 042390.P6391, 26 Pgs.

Tan, et al., "Reduction of Ringing Artifacts After Decompression of a DWT–Based Compressed Image", application No: 09/165,511, Filed: Oct. 2, 1998, Attorney Docket no: 042390.P6200, 20 Pgs.

Tan, et al., "Robust Sequential Approach in Detecting Defective Pixels Within an Image Sensor", application No: 09/191,310, Filed: Nov. 13, 1998, Attorney Docket No: 042390.P6575, 35 Pgs.

Acharya, et al., "Color Interpolation for a Four Color Mosaic Pattern", application No: 09/199,836, Filed: Nov. 24, 1998, Attorney Docket No: 042390.P6376, 26 Pgs.

Acharya, "A Mathematical Model for Gray Scale and Contrast Enhancement for a Digital Image ", application No: 09/207,153, Filed: Dec. 8, 1998, Attorney Docket No: 042390.P6217, 28 Pgs.

Acharya, "Enhancing Image Compression Performance by Morphological Processing", application No: 09/291,810, Filed: Apr. 14, 1999, Attorney Docket No: 042390.P6878, 31 Pgs.

Tan, et al., "Using an Electronic Camera to Build a File Containing Text", Application No: 09/301,753, Filed: Apr. 29, 1999, Attorney Docket No: 042390.P5742, 21 Pgs.

Tsai, et al., "Method and Apparatus for Adaptively Sharpening an Image", application No: 09/320,192, Filed: May 26, 1999, Attorney Docket No: 042390.P6452, 29 Pgs.

Tan, et al., "Method and Apparatus for Adaptively Sharpening Local Image Content of an Image", application No: 09/328,935, Filed: Jun. 6, 1999, Attorney Docket No: 042390.P7125, 29 Pgs.

Tan, et al., "A Hardware Efficient Wavelet–Based Video Compression Scheme", application No: 09/342,863, Filed: Jun. 29, 1999, Attorney Docket No: 042390.P6529, 31 Pgs.

Tan, et al., "A Methodology for Color Correction With Noise Regulation", application No: 09/359,831, Filed: Jul. 23, 1999, Attorney Docket No: 042390.P7320, 30 Pgs.

Alcharya, et al., "A New Block Matching Based Color Interpolation Algorithm", Intel Corporation, Digital Imaging and Video Division, Chandler, AZ, 3 Pgs.

Adams, Jr., "Interactions Between Color Plane Interpolation and Other Image Processing Functions in Electronic Photography".

Eastman Kodak Co., Imaging Research and Advanced Development Rochester, NY, SPIE vol. 2416, pp. 144–151.

"Image Processing and Machine Vision", Chapter 4, pp. 327–330.

Rosenfeld, "Fuzzy Digital Topology", Computer Science Center, University of Maryland, College Park, Printed from Inform, Control, vol. 40, Jan. 1979, copyright by Academic Press, Inc., pp. 331–339.

Roenfeld, "The Fuzzy Geometry of Image Subsets", Center for Automation Research, University of Maryland, College Park, MD, reprinted from Pattern Recognition Letters, vol. 2, Sep. 1984, pp. 340–346.

Dyer, et al., "Thinning Algorithms for Gray–Scale Pictures", Reprinted from IEEE, Pattern Anal. Machine Intel, vol. PAMI–1 Jan. 1979, pp. 347–348.

Pal, et al., "Image Enhancement Using Smoothing With Fuzzy Sets", Reprinted from IEEE Trans. Syst., Man, Cybern., vol. SMC–11, No. 7, Jul. 1981, pp. 349–356.

Li, et al., "Fast and Reliable Image Enhancement Using Fuzzy Relaxation Technique", Reprinted from IEEE Trans. Syst., Man, Cybern., vol. SMC–19, No. 5, Sep./Oct. 1989, pp. 357–361.

Tanaka, et al., "A Study on Subjective Evaluations of Printed Color Images", Image & Information Reasearch Institute, Dai Nippon Printing Co., Tokyo, Japan, Int'l J. Approximate Reasoning, vol. 5, No. 3, Copy right 1991, Elsevier Science Publishing Company, Inc. pp. 362–368.

Pal, et al., "Image Enhancement and Thresholding by Optimization of Fuzzy Compactness", Center for Automation Reasearch, University of Maryland, College Parkway, MD, Reprinted from Pattern Recognition Letters, vol. 7, Feb. 1988, pp. 369–378.

Lim, et al., "On the Color Image Segmentation Algorithm Based on the Thresholding and the Fuzzy c–Means Techniques", Department of Contol and Instrumentation Engineering, Seoul National University, Kwanaj–Ku, Korea, reprinted from Pattern Recognition, vol. 23, No. 9, copyright 1990, Pergamon Press, pp. 379–397.

H. H. Nguyen, P. Cohen, "Gibbs Random Fields, Fuzzy Clustering, and the Unsupervised Segmentation of Textured Images," Graphical Models and Image Processing, Vol 55, No. 1, pps. 1–19, Jan. 1993.

C. Jawahar, A. Ray, "Techniques and Applications of Fuzzy Statistics in Digital Image Analysis," Fuzzy Theory Systems: Techniques and Applications, vol. 2, pps. 759–778, 1999.

S. K. Pal, A. Ghosh, "Image Segmentation Using Fuzzy Correlation," Information Sciences No. 62, pps. 223–250, 1992.

S. K. Pal, N. R. Pal, "Segmentation Based on Measures of Contrast, Homogeneity, and Region Size," IEEE, vol. SMC–17, No. 5, pps. 857–868, Sep./Oct. 1987.

M. Trivedi, J. Bezdek, "Low–Level Segmentation of Aerial Images with Fuzzy Clustering," IEEE, vol. SMC–16, No. 4, pps. 589–597, Jul./Aug. 1986.

H.J. Zimmermann, "Fuzzy Set Theory and Its Applications (Second, Revised Edition)," Allied Publishers Limited, pps. 34–35, 46–49.

* cited by examiner

| 110 | 101 | 111 | 110 | 111 |
|-----|-----|-----|-----|-----|
| 111 | 000 | 011 | 010 | 110 |
| 101 | 010 | 001 | 010 | 101 |
| 110 | 011 | 010 | 001 | 110 |
| 111 | 101 | 101 | 110 | 111 |

Initial Image

Fig. 2

| 110 | 101 | 111 | 110 | 111 |
|-----|-----|-----|-----|-----|
| 111 | x | x | x | 110 |
| 101 | x | x | x | 101 |
| 110 | x | x | x | 110 |
| 111 | 101 | 101 | 110 | 111 |

| x | x | x | x | x |
|---|---|---|---|---|
| x | 000 | 011 | 010 | x |
| x | 010 | 001 | 010 | x |
| x | 011 | 010 | 001 | x |
| x | x | x | x | x |

Segmented Image

Fig. 4

$$d(A) = H(A) + H(\complement A)$$
where $\complement A$ is the complement of A $$H(A) = -K \sum_{i=1}^{n} \mu_A(x_i) \ln(\mu_A(x_i))$$

$$H(\complement A) = -K \sum_{i=1}^{n} (1 - \mu_A(x_i)) \ln(1 - \mu_A(x_i))$$

A + PIXEL SIGNAL VALUE LEVEL 3
A: $\mu(0)$, $\mu(1)$, $\mu(2)$, $\mu(3)$
B: $\mu(4)$, $\mu(5)$, $\mu(6)$, $\mu(7)$ $$d(A,B) = d(A) + d(B) = H(A) + H(\complement A) + H(B) + H(\complement B)$$

$$= -\left[\frac{2}{25 \times 4} \ln\left(\frac{2}{25 \times 4}\right) + \frac{4.5}{25 \times 4} \ln\left(\frac{4.5}{25 \times 4}\right) + \frac{6}{25 \times 4} \ln\left(\frac{6}{25 \times 4}\right) + \frac{4}{25 \times 4} \ln\left(\frac{4}{25 \times 4}\right)\right]$$

$$-\left[\left(\frac{-2}{25 \times 4}\right) \ln\left(1 - \frac{2}{25 \times 4}\right) + \left(1 - \frac{4.5}{25 \times 4}\right) \ln\left(1 - \frac{4.5}{25 \times 4}\right) + \left(1 - \frac{6}{25 \times 4}\right) \ln\left(1 - \frac{6}{25 \times 4}\right)\right.$$

$$\left. + \left(1 - \frac{4}{25 \times 4}\right) \ln\left(1 - \frac{4}{25 \times 4}\right)\right]$$

$$-\left[\frac{3.5}{25 \times 4} \ln\left(\frac{3.5}{25 \times 4}\right) + \frac{8}{25 \times 4} \ln\left(\frac{8}{25 \times 4}\right) + \frac{11}{25 \times 4} \ln\left(\frac{11}{25 \times 4}\right) + \frac{8}{25 \times 4} \ln\left(\frac{8}{25 \times 4}\right)\right]$$

$$-\left[\left(1 - \frac{-3.5}{25 \times 4}\right) \ln\left(1 - \frac{3.5}{25 \times 4}\right) + \left(1 - \frac{8}{25 \times 4}\right) \ln\left(1 - \frac{8}{25 \times 4}\right) + \left(1 - \frac{11}{25 \times 4}\right) \ln\left(1 - \frac{11}{25 \times 4}\right)\right.$$

$$\left. + \left(1 - \frac{8}{25 \times 4}\right) \ln\left(1 - \frac{8}{25 \times 4}\right)\right]$$

Fig. 5

FUZZY BASED THRESHOLDING TECHNIQUE FOR IMAGE SEGMENTATION

RELATED APPLICATION

The patent application is related to concurrently filed U.S. patent application Ser. No. 09/393,017, entitled, "A FUZZY DISTINCTION BASED THRESHOLDING TECHNIQUE FOR IMAGE SEGMENTATION," by Acharya et al., filed on Sep. 10, 1999, assigned to the assignee of the current invention and herein incorporated by reference.

BACKGROUND

1. Field

This disclosure is related to image processing, and, more particularly, to image segmentation.

2. Background Information

As is well-known, image segmentation, in particular, image segmentation of a digital image, has a variety of applications. For example, such approaches may be employed in target tracking and acquisition, navigation systems, recognition systems, video conferencing, robotic vision, etc. These are just a few examples of the types of applications in which image segmentation may be employed. For example, an image may be segmented to be stored more efficiently or to be transmitted across a communications system having scalable bandwidth capabilities and so forth. Nonetheless, image segmentation faces a number of challenges.

One such challenge is segmenting the image where the image content may be blurred, rather than sharp. It is generally easier to segment a sharp image than a blurred image. Another challenge in segmenting an image arises where a histogram of signal values is created based upon the content of the image and that histogram contains discontinuities. Known techniques for segmenting an image do not perform well, typically, in such circumstances. A need, therefore, exists for a method or technique of segmenting an image that addresses these foregoing challenges.

SUMMARY

Briefly, in accordance with one embodiment of the invention, a method of segmenting an image includes the following. At least one signal value level is determined, of the potential signal values of the image, along which to divide a fuzzy histogram into at least two measurement distributions, the histogram being based, at least in part, on the image. The at least one signal value level is the at least one of the potential signal value levels of the image that produces a divided fuzzy histogram having, based on calculating entropy, an extreme value of one of distinctiveness and fuzziness. The image is segmented using the at least one signal value level.

Briefly, in accordance with another embodiment of the invention, a method of As segmenting an image includes the following. A fuzzy histogram is constructed based, at least in part, on the signal values levels of the image. The fuzzy histogram is divided into at least two measurement distributions along at least one of the potential signal value levels of the image to produce a divided fuzzy histogram. One of the distinctiveness and the fuzziness for the divided fuzzy histogram is computed using entropy. The prior operations are repeated for every potential signal value level of the image. The at least one signal value level of the potential signal value levels that provides the divided fuzzy histogram with an extreme value of one of the distinctiveness and the fuzziness is determined. The image is segmented using the at least one signal value level.

Briefly, in accordance with yet another embodiment of the invention, an article includes: a storage medium having stored thereon instructions that, when executed by a computing platform, result in the following operations by the computing platform to segment an image. At least one signal value level of the potential signal value levels of the image along which to divide a fuzzy histogram is determined, the fuzzy histogram being based, at least in part, on the image, the at least one signal value level being the at least one of the potential signal value levels that produces a divided fuzzy histogram having an extreme based on calculating entropy. The image is segmented image using the at least one signal value level.

BRIEF DESCRIPTION OF THE DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description, when read with the accompanying drawings in which:

FIG. 2 is a schematic diagram illustrating a five pixel-by-five pixel digital image to which the embodiment of FIG. 1 may be applied;

FIG. 4 is a schematic diagram illustrating segmented portions of the digital image of FIG. 2 obtained after applying the embodiment of FIG. 1;

FIG. 5 is a set of equations illustrating a calculation of entropy in accordance with the embodiment of FIG. 1 for the divided fuzzy histogram that provides the greatest distinctiveness for the digital image of FIG. 2.

DETAILED DESCRIPTION

Figure 1:
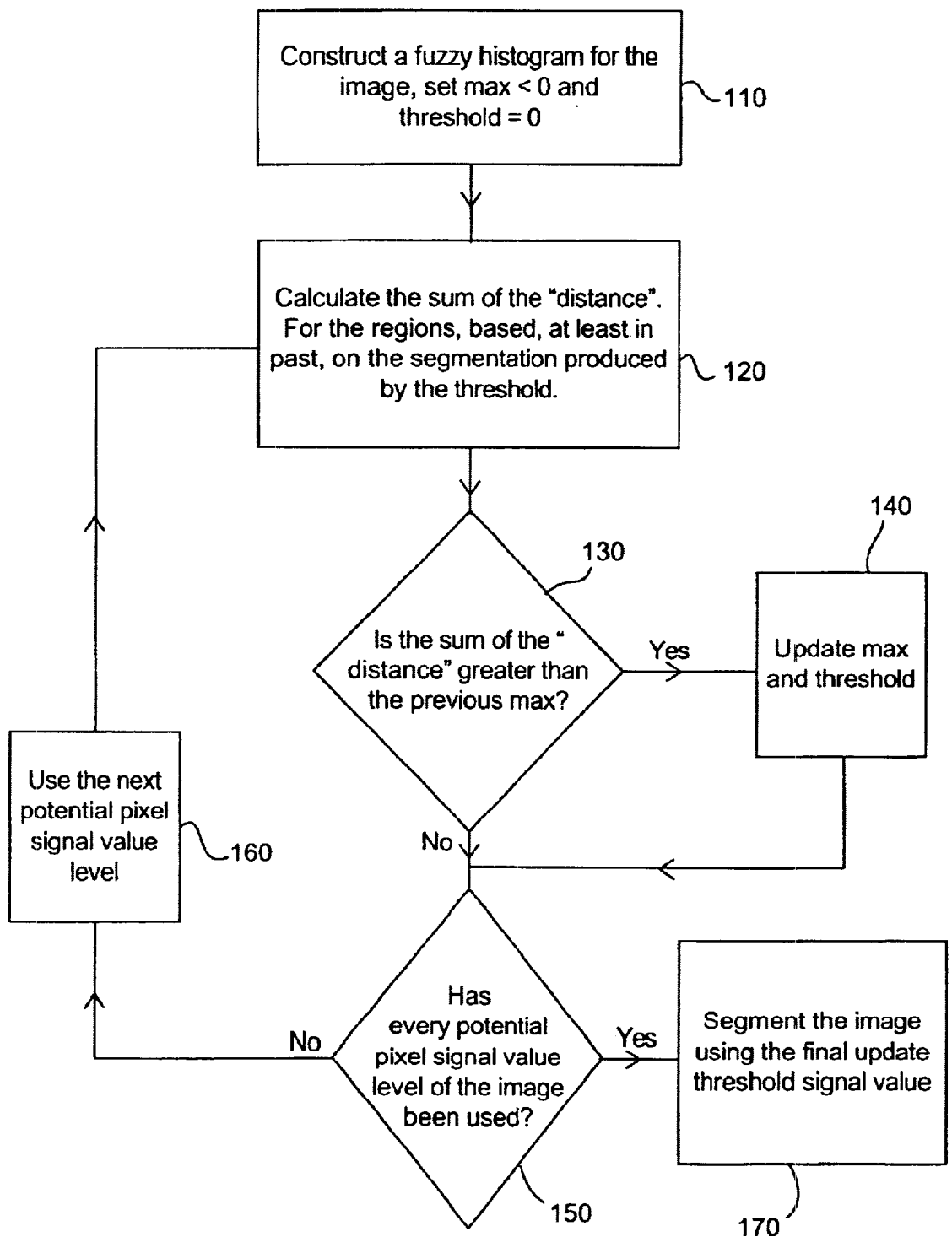
FIG. 1 is a flowchart illustrating an embodiment of a method of segmenting an image in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As shall become more clear, an embodiment in accordance with the present invention relates to image processing, such as digital image processing. It is noted that, where digital image processing is involved, the invention is not limited in scope to a digital image of any particular dimensions. Likewise, the signal values or pixel signal values in particular pixel locations are not restricted in format or size. For example, although the invention is not limited in scope in this respect, an eight bit binary digital signal may be employed to represent the signal value in each pixel location; however, alternatively, for example, analog, rather than digital, signal values may be employed. Similarly, although a digital image, for example, may comprise a rectangle having the dimensions M pixels by N pixels, where M and N are positive integers, of course, the invention is not limited to a digital image of this particular shape. Nonetheless, a typical format employed in this context comprises the common interchange format (CIF) comprising 352 pixels by 288 pixels, although the invention is not limited in scope in this respect. Likewise, the image is not restricted in scope to employing either color or gray scale pixel signal values. Likewise, if color is employed, any one of a number of color space formats may be employed, such as the YUV or RGB color space format.

As previously indicated, image processing, such as for digital images, has a number of challenges. In particular, it is not clear how to approach segmenting a digital image, for example, where significant amounts of blurring are present in the image. Likewise, it is not clear how to segment an image where discontinuities exist in a histogram constructed representing the occurrence or frequency of pixel signal values in the digital image. This means, for example, that some signal value levels that are potential signal value levels for the image are, nonetheless, not present in the digital image, for example, at all. In this context, a "crisp" histogram refers to a histogram that provides the frequency of occurrence of all the potential pixel signal value levels of the image, including those pixel signal value levels which, for that particular pixel signal value level, have a zero frequency of occurrence or magnitude. Throughout this detailed description, the term "histogram" when used by itself refers to a "crisp" histogram as just described. For images that include sharp edges, typically, image segmentation is applied in the vicinity of such edges. However, for segmentation of an image that is blurred or includes blurring, it is frequently difficult to resolve or rely on such edges. Since images are 2D projections of 3D world, information is lost and thereby some uncertainty is introduced in the description of the images. This uncertainty may be manifested in the variability of pixel gray levels in an image, for example. Many prominent image definitions, including the boundary between image regions, contrast, etc. are essentially vague and, thus, fuzzy notions may assist with characterization. The management of this uncertainty in the pixel classification remains a useful application area in image processing. In conventional literature on segmentation, one idea has at time been overlooked and that is, the segmented regions need not be mutually exclusive. It may be useful to focus on how closely the segmented description can reproduce the characteristics of the region. A possible approach includes defining fuzzy regions characterized by a continuous gradation of membership in it. Several techniques have been proposed in the literature on the application of fuzzy set theory in image segmentation, such as in S. K. Pal and N. R. Pal, "Segmentation based on measures of contrast homogeneity and region size," IEEE Trans System, Man and Cybernetics, 17, pp 857–868(1987), and in, S. K. Pal and A. Rosenfield, "Image enhancement and thresholding by optimization of fuzzy compactness", Pattern Recognition, Vol. 7, pp 77–86(1988). Some of the works include thresholding techniques which reduce, typically to an extreme, the fuzziness in pixel classification. Clustering techniques were also reported for image segmentation based on Fuzzy c-means, as in, J. C. Bezdek, *Pattern Recognition using fuzzy objective function algorothms*, Plenum Press, New York (1981). Such approaches have been used for segmentation of textured images, see H. H. Nguyen and P. Cohen, "Gibbs random field, fuzzy clustering and the unsupervised segmentation of textured images," CVGIP: Graphic Models & Image Processing, Vol 55, pp 1–19(1993), and also for segmentation of remotely sensed aerial Scenes, M. Trivedi and J. C. Bezdek, "Low level segmentation of aerial images with fuzzy clustering," IEEE Trans System, Man and Cybernetics, Vol-16, pp 341–359(1986).

Figure 6:
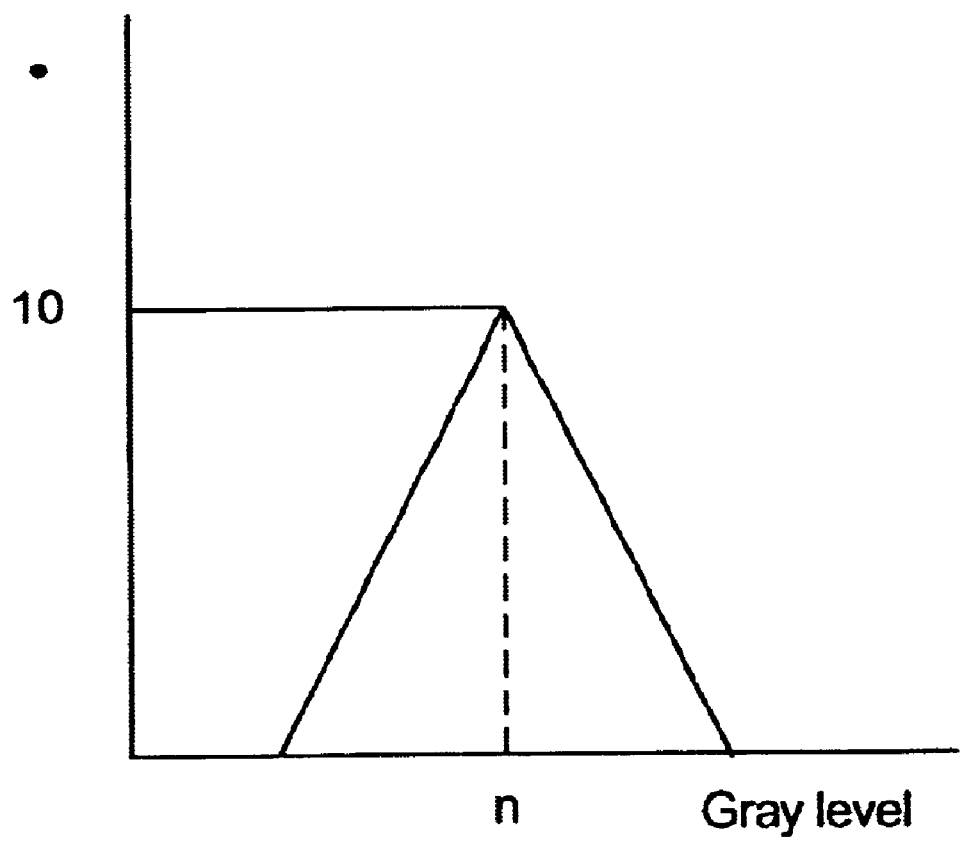
FIG. 6 is a plot illustrating a typical shape of a membership distribution that may be employed to characterize a "fuzzy number."

In a digital image, it is possible to have a reasonable number of pixels with, for example, gray values (n−1) as well as (n+1), where n is an integer, without the presence in the image of any pixels with a gray value of n. However, typically, this does not affect human visual response to the image. More particularly, the digital image would not look perceptively different, if, in fact, instead of (n+1) or (n−1), a gray value of n were present in the image. This effect suggests that, for a digital image, gray values or pixel signal value levels may be treated as "fuzzy numbers" which are, in theory, normally convex sets on the real line. As shall be described in more detail hereinafter, this approach may, therefore, be employed to construct a "fuzzy histogram." In the case of a "crisp" histogram, the frequency of occurrence of a particular gray value does not affect the occurrence of other gray values. In other words, the occurrences are independent events. However, in the case of a fuzzy histogram, a gray value with more ambiguity may contribute to the frequency of occurrence of nearby gray values according to a membership assignment method. Thus, the frequency of occurrence of gray values, for example, may be characterized as "around n" for a fuzzy histogram. Symmetrical or asymmetrical fuzzy numbers are employed to represent the notion of a gray level "around n." A symmetrical fuzzy number may be characterized by a membership distribution $$\mu_A(x)=f(|x-n|,\alpha)$$

where $\alpha$ a controls the spread of the triangle and the function $f(.)$ controls the shape of the fuzzy number. Although the invention is not limited in scope in this respect, a typical shape of a triangular fuzzy number which is symmetrical is shown in FIG. 6 and is given by $$\mu_A(x)=\max(0,1-(|x-n|/\alpha)) \qquad [1]$$

Therefore, in this context, a fuzzy histogram of a digital image is a sequence of real numbers with $S_n$ representing the frequency of occurrence of digital pixel signal values that are "around n." Note that the sequence and n may be continuous in some situations, in which case, the fuzzy histogram may be referred to as a fuzzy distribution, although, for convenience, the term fuzzy histogram will be used throughout this specification with no loss of generality.

Here, let $u_A(x)$ designate the membership function of the fuzzy set A with x being an element of X, where X is finite. If the measure of fuzziness of the fuzzy set A, as described in H. J. Zimmermann, *Fuzzy Set Theory and its Applications*, 2d edition, Kluwer Academic Publishers, London, is denoted d(A), then this measure may desirably exhibit the following properties:

1. d(A) equals zero if A is a crisp set in X.
2. d(A) assumes a unique maximum if $u_A(x)$ equals 0.5, for all x that is an element of X.
3. d(A) is greater than or equal to d(A*), if A* is "crisper" than A, ie, $u_A^*(x)$ is less than or equal to $u_A(x)$, for $u_A(X)$ less than or equal to 0.5, and, $u_A^*(X)$ is greater than or equal to $u_A(X)$, for $u_A(X)$ greater than or equal to 0.5.
4. d(not-A) equals d(A), where "not-A" designates the complement of A.

It is noted that although the membership function here is described in terms of fuzziness, alternatively, it could be described in terms of distinctiveness with similar properties because there is a well-defined relationship between distinctiveness and fuzziness in this context. One approach to measuring fuzziness that satisfies the four properties above is to employ the well-known measure of entropy, introduced originally by Shannon, as a measure of distinctiveness. Entropy as a measure of a fuzzy set $A=\{(x, u_A(X)\}$ is defined as follows:

$$d(A)=H(A)+H(\text{not-}A), \text{ x being an element of X} \qquad [2]$$

where, $H(A) = -K \Sigma_{I=1 \text{ to } n} u_A(X_I) \ln(u_A(X_I))$ $H(\text{not-}A) = -K \Sigma_{I=1 \text{ to } n} (1-u_A(X_I)) \ln(1-u_A(X_I))$ where K is a positive integer (1 in this context), and "ln" denotes the natural logarithm.

FIG. 1 is a flowchart illustrating an embodiment of a method of segmenting an image, such as a digital image, in accordance with the present invention that employs a measure of fuzziness based on entropy, as discussed above. In this approach, a pixel signal value level is determined along which to divide a fuzzy histogram. The fuzzy histogram is based, at least in part, on the image to be segmented. In this embodiment, the determined pixel signal value level is the pixel signal value level of the potential pixel signal value levels that produces a segmented characterization, by dividing the fuzzy histogram into at least two measurement distributions, having a measure of fuzziness, based on a calculation entropy, that is an extreme value. As one example, the fuzziness measurement may not be less than the fuzziness measurement of any other divided fuzzy histograms that are divided into distributions at other potential pixel signal values. Of course, the invention is not limited in scope to this particular embodiment. For example, in alternative embodiments, more than two measurement distributions may be employed. Likewise, an extreme value of the relevant parameter may be used successfully, in accordance with the particular context. For example, in equation [2] above, in an alternative embodiment, the minus sign may be omitted. Therefore, employing the greatest or least may depend on the context or situation. Further, in this embodiment, as described in more detail hereinafter, the digital image is then segmented using the determined signal value level.

Initially, at 110 in FIG. 1, a fuzzy histogram, or its equivalent, is constructed based, at least in part, on the image, in this example, a digital image. This is accomplished by producing a fuzzy histogram of all possible pixel signal value levels of the digital image and, for each pixel to signal value level, the fuzzy histogram is calculated in this embodiment in accordance with equation [1], although, of course, the invention is not limited in scope in this respect. Any one of a number of distributions for characterizing a "fuzzy number" may be employed to construct a fuzzy histogram and provide satisfactory results and the invention is, therefore, not restricted in scope to any particular one. To illustrate the calculation, for a digital image in which the pixel signal values comprise eight bits, the "bins" of the histogram, or potential pixel signal value levels, include 0 to 255. Then, using this histogram, entropy, according to equation [2] above, is calculated. To calculate the entropy in this particular embodiment, the fuzzy histogram is divided into at least two membership distributions along at least one of the potential pixel signal value levels of the digital image. For example, assume that a particular pixel signal value level is the $s^{th}$ signal value, eg, in this embodiment, "0" is the $1^{st}$, "1" is the $2^{nd}$, etc. Then, at 120, the entropy is computed for a membership distribution of the $1^{st}$ to $s^{th}$ pixel signal value levels and then, separately, the entropy is computed for a membership distribution of the $(s+1)^{th}$ to $n^{th}$ pixel signal value levels. In this embodiment, these operations or calculations are then repeated for every potential signal value level of the digital image. More specifically, via a loop formed by 130, 140, 150, 160 and 120, the fuzzy histogram is divided into at least two membership distributions along another at least one potential pixel signal value level, but the level is different than a previous at least one pixel signal value level for which this calculation has already been performed. Then, at 130 again, the distinctiveness for this divided fuzzy histogram is computed based on an entropy calculation, as previously described. As indicated previously, the construction of the divided fuzzy histogram and computation of its fuzziness is repeated for every potential pixel signal value level, from the $1^{st}$ to $n^{th}$, in this embodiment. Once this has been accomplished, at 170, in this embodiment, it is determined which potential pixel signal value level provides the divided fuzzy histogram (or divided fuzzy histograms) having a calculated measure of fuzziness that is the extreme. More specifically, for each potential pixel to signal value level, in this embodiment, the entropy for the at least two membership distributions is summed and the sum is employed as a measure of the distinctiveness of that particular fuzzy histogram. Thus, at 170, the pixel signal value level that provides the distinctiveness, over the potential pixel signal value levels, not exceeded by any other is the pixel signal value level that is used to segment the digital image. Where more than one level results, such as because the same value results, either level may be employed, of course.

Segmentation may be accomplished a variety of ways, depending, for example, on the particular application, and the invention is not limited in scope to a particular approach. For example, all the pixel locations having a pixel signal value exceeding the determined or threshold pixel signal value level may be included in one image or frame in a video sequence of image frames, and those locations where the pixel signal value does not exceed this level may be considered as an object and this may be included in the image frame. Likewise, the reverse may be done in a second frame or image, eg, omitting those pixel signal values that exceed the determined or threshold level and including the pixel signal values for those locations where the pixel signal value level does not exceed the determined level.

Figure 3:
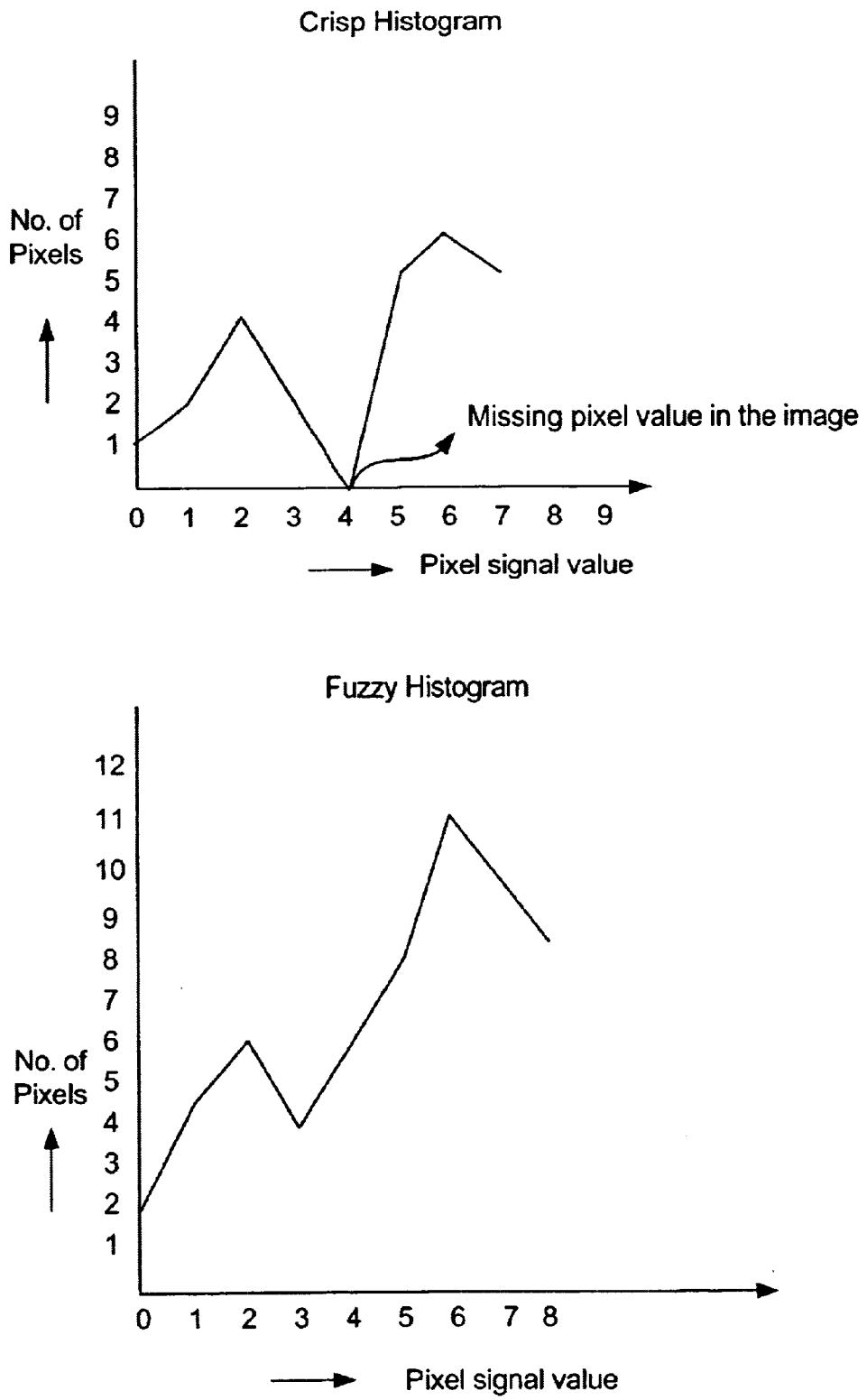
FIG. 3 is a plot of "crisp" histogram and a "fuzzy" histogram produced by applying the embodiment of FIG. 1 to the digital image of FIG. 2.

A sample application of this particular embodiment is illustrated in FIGS. 2 and 3. This is, of course, provided merely for purposes of illustration and is not intended to be limiting in any respect. FIG. 2 is a diagram illustrating a five pixel-by-five pixel digital image. In this particular embodiment, the pixel signal values each comprise three bits. Therefore, the pixel signal value levels are from 0 to 7 in this example. FIG. 3 is a plot illustrating the "crisp" histogram constructed from this digital image. In this simple example, by inspection of the histogram in FIG. 3, it might be deduced that the pixel signal value level that produces the greatest distinctiveness is pixel signal value level 4 or 5. The entropy calculation using equation [2], illustrated in FIG. 5 for the two membership distributions formed, confirms this. Of course, for a digital image with hundreds of pixel signal value levels, and thousands of pixels, making this determination is more challenging, and the approach of this particular embodiment may be advantageously employed. Furthermore, once the image has been segmented, such as in accordance with the embodiment previously described, for example, then this approach may be applied to the segmented portions of the image to further segment those segmented portions Of course, a variety of segmentation approaches may be employed for color images. For example, where the color space format of the image comprises a three-color plane color space format, such as the YUV color space format of the RGB color space format, a variety of techniques may be employed, although the invention is not limited in scope to these techniques or to employing color images or three-color plane color space formats. Nonetheless, in one embodiment, a fuzzy histogram may be produced for each color space, and the pixel signal value employed may be based, at least in part, on all three. Likewise, the color image may be segmented by segmenting all three color space planes of the image. Alternatively, a fuzzy histogram may be produced for any one of the color space planes or for only a selected one of the color space planes, and, again, all three color-space plane images of the color image may be segmented. Of course, additional variations are also possible and within the scope of the present invention. Alternatively, an image may be represented in YUV color space format where the Y component contains luminance signal information about the image. Thus, the previously described embodiment may be applied to the Y component of the image to produce a segmented characterization of the color image.

In this particular embodiment, where entropy is employed as a measure of fuzziness, an interpretation of the approach employed is that the image is being segmented into separate regions that individually exhibit the distinctiveness of each region. This may also provide an approach to compress the distinctly separate regions by using the redundant signal information. This may prove useful in a variety of contexts, such as, where the segmented portions of the image are to be compressed and separately transmitted across a limited bandwidth communications channel, for example. It is, likewise, noted that the approach employed in this particular embodiment does not have difficulty dealing with blurring or with discontinuities in the histogram generated from the image. For example, the histogram in FIG. 3 shows such a discontinuity. Therefore, this particular embodiment has advantages over alternative approaches of image segmentation.

It will, of course, be appreciated, as previously indicated, that the invention is not limited in scope to the previously described embodiment. For example, alternatively, a computing platform, such as, for example, a personal computer, including a desktop or laptop computer, or a server, may include hardware and/or software and/or firmware that provides the capability for the platform to perform image segmentation in accordance with the present invention, such as, for example, by employing the technique previously described and illustrated. Likewise, in an another alternative embodiment, a storage medium, such as a compact disk, a hard disk drive, or a floppy disk, for example, may have stored thereon instructions that, when executed by a computing platform, result in image segmentation being performed in accordance with the present invention.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of segmenting a image comprising:
   determining at least one signal value level of the potential signal value levels of the image along which to divide a fuzzy histogram into at least two measurement distributions, the fuzzy histogram being based, at least in part, on the image, the at least one signal value level being the at least one of the potential signal value levels that produces a divided fuzzy histogram having, based on calculating entropy, an extreme value of one of distinctiveness and fuzziness; and
   segmenting the image using the at least one signal value level.

2. The method of claim 1, wherein the image comprises a digital image having digital pixel signal value levels at each pixel location of the digital image.

3. The method of claim 2, Wherein the digital pixel signal values each comprise a plurality of bits.

4. The method of claim 3, wherein the plurality of bits comprises eight bits.

5. The method of claims 3, wherein the digital image comprises a gray scale digital image and the digital signal pixel value levels of the digital image comprise gray scale digital signal value levels.

6. The method of claim 3, wherein the digital image comprises a color digital image, and wherein the color space format of the color digital image comprises a three-color plane color space format.

7. The method of claim 6, wherein determining the digital pixel signal value level comprises determining the digital pixel signal value level based, at least in part, on all three color space planes of the digital image.

8. The method of claim 7, wherein segmenting the digital image comprises segmenting all three color space planes of the digital image.

9. The method of claim 6, wherein determining the digital pixel signal value level comprises determining the digital pixel signal value level based, at least in part, on at least any one of the color space planes of the digital image.

10. The method of claim 9, wherein segmenting the digital image comprises segmenting all three color-space planes of the digital image.

11. The method of claim 9, wherein determining the digital pixel signal value level comprises determining the digital pixel signal value level based, at least in part, on only one of the color space planes of the digital image.

12. The method of claim 11, wherein segmenting the digital image comprises segmenting all three color space planes of the digital image.

13. The method of claim 3, wherein the color space format of the color digital image comprises the YUV color space format.

14. The method of claim 3, wherein the color space format of the color digital image comprises the RGB color space format.

15. The method of claim 3, wherein determining the at least one digital pixel signal value along which to divide the fuzzy histogram comprises determining more than one digital pixel signal value along which to divide the fuzzy histogram.

16. The method of claim 15, wherein determining more than one digital pixel signal value along which to divide the fuzzy histogram comprises determining two digital pixel signal values along which to divide the fuzzy histogram.

17. The method of claim 15, wherein determining more than one digital pixel signal value along which to divide the fuzzy histogram comprises determining three digital pixel signal values along which to divide the fuzzy histogram.

18. The method of claim 3, and further comprising:
   determining at least one digital pixel signal value level along which to divide another fuzzy histogram, the another fuzzy histogram being based, at least in part, on one of the segmented portions of the digital image, the at least one digital pixel signal value level of the another fuzzy histogram being the at least one of the potential digital pixel signal value levels of the digital image that produces a divided another fuzzy histogram having the largest distinctiveness based on calculating entropy; and segmenting the one of the segmented portions of the digital image using the at least one digital pixel signal value level.

19. The method of claim 1, wherein the at least one level of the potential signal values produces a divided fuzzy histogram having the greatest distinctiveness.

20. A method of segmenting an image comprising:

constructing a fuzzy histogram based, at least in part, on the signal value levels of the image, wherein the fuzzy histogram is divided into at least two measurement distributions along at least one of the potential signal value levels of the image;

computing one of the distinctiveness and the fuzziness for the divided fuzzy histogram using entropy;

repeating the prior two operations, constructing and computing, for every potential signal value level of the image;

determining the at least one signal value level of the potential signal value levels that provides the divided fuzzy histogram with an extreme value of one of the distinctiveness and the fuzziness; and segmenting the image using the at least one signal value level.

21. The method of claim 20, wherein the image comprises a digital image having digital pixel signal value levels at each pixel location of the digital image.

22. The method of claim 21, wherein the digital pixel signal values each comprise a plurality of bits.

23. The method of claim 22, and further comprising:

determining at least one digital pixel signal value level along which to divide another fuzzy histogram, the another fuzzy histogram being based, at least in part, on one of the segmented portions of the digital image, the at least one digital pixel signal value level of the another fuzzy histogram being the at least one of the potential digital pixel signal value levels of the digital image that produces a divided another fuzzy histogram having the largest distinctiveness based on calculating entropy; and segmenting the one of the segmented portions of the digital image using the at least one digital pixel signal value level.

24. An apparatus comprising:

a computing platform, said computing platform being adapted to segment an image;

said computing platform further including the capability to:

determine at least one signal value level of the potential signal value levels of the image along which to divide a fuzzy histogram, the fuzzy histogram being based, at least in part, on the image, to produce a divided fuzzy histogram, the at least one signal value level being the at least one of the potential signal value levels that produces a divided fuzzy histogram having the largest distinctiveness based on calculating entropy; and segment the image using the at least one signal value level.

25. The apparatus of claim 24, wherein said computing platform comprises at least one of a desktop personal computer, a laptop personal computer, and a server.

26. The apparatus of claim 24, wherein said computing platform is further adapted to segment a digital image having digital pixel signal value levels in each pixel location of the digital image.

27. The apparatus of claim 25, wherein the digital pixel signal values of the digital image each comprise a plurality of bits.

28. An article comprising: a storage medium having stored thereon instructions that, when executed by a computing platform, result in the following operations by the computing platform to segment an image:

determining at least one signal value level of the potential signal value levels of the image along which to divide a fuzzy histogram, the fuzzy histogram being based, at least in part, on the image, to produce a divided fuzzy histogram, the at least one signal value level being the at least one of the potential signal value levels that produces a divided fuzzy histogram having an extreme based on calculating entropy; and segmenting the image using the at least signal value level.

29. The article of claim 28, wherein said storage medium has stored thereon instructions that, when executed, further result in the computing platform segmenting a digital image having digital pixel signal value levels in each pixel location of the digital image.

30. The article of claim 29, wherein the digital pixel signal values of the digital image each comprise a plurality of bits.

* * * * *

UNITED STATES PATENT AND TRADEMARK OFFICE
CERTIFICATE OF CORRECTION

PATENT NO. : 6,658,399 B1
DATED : December 2, 2003
INVENTOR(S) : Acharya et al.

It is certified that error appears in the above-identified patent and that said Letters Patent is hereby corrected as shown below:

<u>Title page,</u>
Item [73], Assignees, insert -- The Board of Governors of the Indian Institute of Technology, Kharagpur, India --.

<u>Column 5,</u>
Line 49, before "signal", delete "to".

<u>Column 6,</u>
Line 23, before "signal", delete "to".

Signed and Sealed this

First Day of June, 2004

JON W. DUDAS
*Acting Director of the United States Patent and Trademark Office*